UNITED STATES PATENT OFFICE.

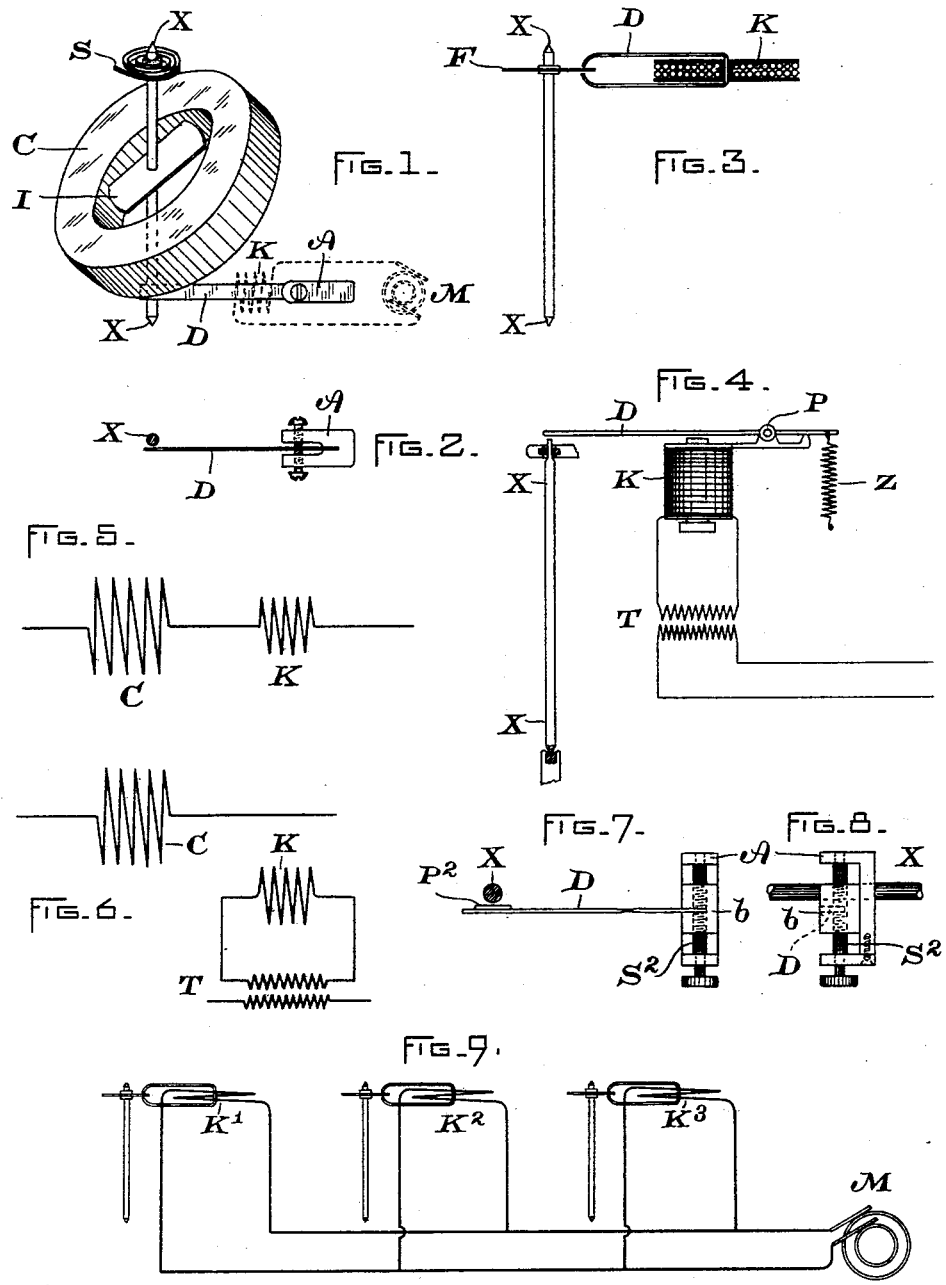

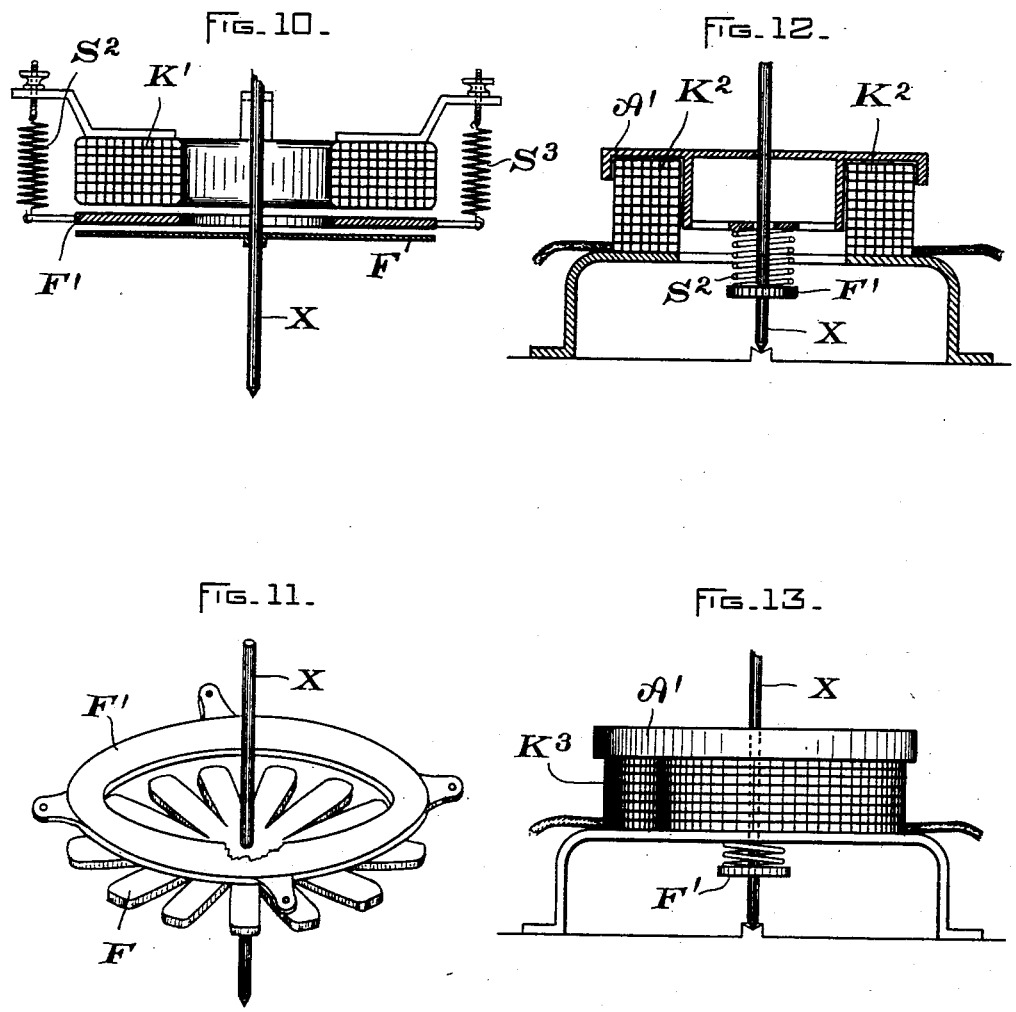

ELIHU THOMSON, OF SWAMPSCOTT, MASSACHUSETTS, ASSIGNOR TO THE GENERAL ELECTRIC COMPANY, OF NEW YORK.

DAMPER FOR ELECTRICAL MEASURING INSTRUMENTS.

SPECIFICATION forming part of Letters Patent No. 591,898, dated October 19, 1897.

Application filed July 22, 1897. Serial No. 645,492. (No model.)

*To all whom it may concern:*

Be it known that I, ELIHU THOMSON, a citizen of the United States, residing at Swampscott, in the county of Essex, State of Massachusetts, have invented certain new and useful Improvements in Dampers for Electrical Measuring Instruments, (Case No. 565,) of which the following is a specification.

My present invention relates to improved means for damping or preventing excessive oscillation of the indicators of electric measuring instruments. It is chiefly applicable to those through which alternating currents are passed, but may be adapted to operate with continuous-current instruments.

The principle of the invention is to cause by alternating currents or other rapid impulses of current which pass through zero values the operation of intermittently-acting retarding mechanism—such, for instance, as a brake—the needle or indicator being free to move between the times of operation of the retarding mechanism.

In the drawings, Figure 1 is a view exemplifying some features of my invention as applied to a particular form of instrument. Fig. 2 is a partial plan of the same parts. Figs. 3 and 4 are modifications. Figs. 5 and 6 show suitable circuit arrangements. Figs. 7 and 8 show a means for securing adjustment of my damping device. Fig. 9 shows how several instruments may be damped. Figs. 10 to 13 are modifications.

In Fig. 1 the coil C represents a coil of a measuring instrument for alternating currents, such as is described in my United States Patent No. 542,663 and others. X X is a vertical shaft passed at an angle through the coil and bearing the movable element—in this case a small plate I, of iron, inclined to the shaft. S represents the control-spring, one end fastened to the shaft X X and the other to a fixed support. (Not shown.) The bearings for shaft X X are also not shown, but are of the usual type such as allow the shaft to turn freely. They are carried by the fixed framework of the complete instrument. Suitable devices may be used for causing the movement of the shaft in any of the usual ways. On account of their varied character they are not illustrated. In the arrangements shown in Fig. 1 when an alternating current is passed through coil C the shaft X X, of soft iron or steel or magnetic metal, is alternately magnetized in one direction and the other and exhibits alternating polarities above and below the coil. At each zero-point of current or shortly thereafter the shaft X X is for a brief instant unmagnetized or demagnetized. I utilize these conditions to damp the movements of rotation of the shaft or its oscillations by placing a small piece of sheet iron or steel near the shaft at some point, as D, Figs. 1 and 2. Its proximity to the shaft X X is adjusted so that under the magnetic action of any given current in coil C during each impulse or oscillation it shall on account of its flexibility be attracted toward the shaft, being released at the zeros of current. It suffices for this that the piece D be slightly flexible and supported at A, a little distance from the shaft. The fixed support A carries adjusting-screws, whereby the free end of damper D may be set in relation to the shaft. The piece D may be covered with a layer of varnish or thin paper where it comes into contact with the shaft, to prevent magnetic sticking. With this simple damping device I am able to cause complete suppression of oscillation or swinging of the needle or indicator for any value of current which will definitely magnetize the shaft X X, and for practical purposes this covers the range of current values giving readings of from fifteen per cent. to the total current capacity of the instrument. The needle is, moreover, entirely free at the zero and when no current passes, and the damping action begins at moderate values. Thus an instrument whose total measuring capacity might be represented by "100," if it have a current represented by "30" suddenly put on, at once indicates "30" without oscillation of the needle. The same action occurs with higher or lower values of current.

The theory of the damper is very simple. Between every alternation of the current supplied there is a zero of current and magnetizing force, and during each pulse or alternate flow a wave of magnetism is induced in the shaft X X, which draws the damper D into contact with the shaft and checks its movement, while at the zeros of magnetism it is free to move, so that we have alternately a freedom of movement and a check upon it occurring at a rate equal to double the frequency of the alternating-current waves. This effectually checks all swing, either rhythmic or erratic, but allows ample opportunity for the indicator of the instrument to move to the point corresponding with the forces to be measured.

In Fig. 3 a modification is shown wherein a separate electromagnet D is provided with an energizing-coil K, through which alternating or rapidly-intermittent currents are passed. The poles of magnet D are slightly movable toward and from each other under these magnetic forces, opposed by the elasticity of the parts. The poles might embrace the shaft X X of an electrical measuring instrument, the oscillations of which were to be damped; but I have shown as a better arrangement a thin disk F, carried by the shaft and entering the narrow gap between them. Disk F may be of iron, copper, or other metal or of non-magnetic substance. The action is the same as before. When the current-pulses are in K, the poles of D are drawn together and grip the disk F, but at the zeros of current it is free to rotate. If the current supplied to coil K be rapidly intermitted, the results will be much the same as with alternating currents, and in such case the damper may act to check the movements of instruments not electrical in nature, such as magnetic compasses or magnetometers; or it may be used with instruments operated by continuous or alternating currents, or both. It will be evident that if damper D, Figs. 1 and 2, were surrounded by a coil K (shown in dotted lines) it could act as a damper independently of the currents in coil C of the instrument proper, and where these currents are of very small value and feeble magnetizing force such an arrangement might be preferred.

In Fig. 4 I have shown an ordinary electromagnet for alternating or intermittent currents, the coil K of which when suitably energized either directly or inductively by transformation, as at T, from a current source magnetizes the magnet-cores and attracts the armature or armature-lever D, pivoted at P and provided with a retractile spring Z. The shaft X X, the oscillations of which are to be checked or damped, is arranged to be struck intermittently in any suitable way by D. If the current-coil of the instrument proper be traversed by an alternating current, it may, as in Fig. 1, be the source of the magnetism which damps the instruments, or the arrangement of Fig. 4 might have the coil K connected in series with the current-coil C, as in Fig. 5. When, however, it is desirable to feed the damper separately from the main coil of the instrument, as may be the case when coil C is traversed by continuous current, then the connections which may be employed are shown in Fig. 6. Coil C is here in an entirely separate circuit, while the damper-coil K is in a circuit by itself, fed by a special transformer T, though it might be directly connected. It is, of course, desirable to be able to adjust accurately the positions of the shaft or part whose movement is to be damped with relation to the magnetic damper of my invention. If the arrangement in Fig. 1, for example, be used, then the slip of iron D may be carried between adjusting-screws on a suitable fixed frame, the piece D being inserted, preferably, into a suitable nut $b$ capable of movement up or down, (see Fig. 7)—that is, toward and from the shaft or axis X. This may be done by simply carrying a screw $S^2$ through the nut to which the piece D is secured. Another view of the same arrangement is seen in Fig. 8. To avoid the sticking of the piece D to the shaft X, which might occur since both are of iron or steel, a slip of fine paper, acting as a separator $P^2$, may be placed between the two surfaces.

Fig. 9 shows how a number of damper-coils, as $K'$ $K^2$ $K^3$, may be fed in multiple from the same source. The utility of this is manifest where it is desired to damp all of the instruments of a switchboard, as this may be simultaneously effected by leading a single alternating-current connection from the source M.

Figs. 10 and 11 show arrangements whereby the repulsive action of an alternating current, in setting up currents in a closed conductor or disk, may be employed to operate the damper for checking the oscillations of the needle or pointer. In Fig. 10 the coil $K'$ is a stationary coil supported in any suitable way, so as to have the axle X of the instrument in its center. The metal plate F is affixed to the shaft X and moves with it. It is parallel to the coil $K'$ and separated from it a slight distance. $F'$ is a ring of copper situated between the coil $K'$ and the metal plate F, supported upon springs $S^2$ $S^3$ from any suitable stationary supports. Alternating current is supplied to the coil $K'$ during the operation of the instrument, and this coil may, if desired, be placed in series with the resistance which is commonly employed to cut down the current passing to the armature or moving coil of the instrument. When in this case the current passing through the moving coil is large, and consequently violent oscillations are produced in the index or pointer with ordinary constructions, the current passing in $K'$ sets up secondary currents in the plate or disk $F'$ and repels it against the action of the springs $S^2$ $S^3$, which are adjustable to determine the extent of the repulsive action. The plate or disk $F'$ is thus caused to make contact with the plate F on the shaft X and checks the rapid oscillation or swinging of the latter. The plate F may be either of copper or iron. It will be noted that the currents set up by induction from the coil K' in the plates F and F' are in the same direction and therefore said plates will attract each other or will tend to approach, thus supplementing the repulsive effect of the coil K' on the plate F' alone.

In Fig. 11 I show that the plate F, affixed to the axle X, may be slotted or made in the form of a star, in which case the plate F'', which is intended to be supported as is the plate F', Fig. 10, is moved toward F by repulsive influence alone.

In Figs. 12 and 13, (the latter being a side elevation of the parts shown in Fig. 12,) $K^2$ represents a stationary coil supplied with alternating current the same as the coil K' in Fig. 10 and similarly supported around the shaft, upon which is mounted a spring $S^2$ which supports a circular armature A', partly inclosing the coil $K^2$, but normally held out of contact with it by the spring $S^2$. Upon the passage of alternating currents in $K^2$ the armature A' is attracted against the influence of the spring $S^2$ until it comes into contact with the coil $K^2$ and checks the movements of the shaft X, to which is attached a pointer or index.

In all of the above constructions the action is intermittent, as it is in the former figures, and therefore there is no interference with the proper working of the instrument.

What I claim as new, and desire to secure by Letters Patent of the United States, is—

1. A damping mechanism consisting of a moving member, a brake-piece, and a coil inducing an alternating magnetic field acting upon the brake-piece to alternately apply and release it, as described.

2. In an electric measuring instrument, a movable element adapted to indicate current values, a circuit carrying the current to be measured, and a damper composed of magnetizable material arranged adjacent to the movable part of the instrument, and means for producing in the damper an intermittent magnetization to cause it to alternately engage and release the movable part.

3. In an electric measuring instrument, a circuit carrying the alternating current to be measured, a movable part acting as an indicator, and a damper consisting of a resilient strip of sheet iron or steel mounted near the movable part and alternately engaging and releasing it as the waves of alternating current pass through the instrument.

4. In an electric measuring instrument, a circuit carrying the current to be measured, a movable part acting as an indicator, and a damping device consisting of a strip of sheet iron or steel adjustably mounted near the moving part of the instrument, with means for alternately magnetizing the strip.

5. In an electric measuring instrument, a circuit carrying the current to be measured, a movable element acting as an indicator, a damping device consisting of a strip of sheet iron or steel mounted near the moving element of the instrument, and a coil carrying alternating or intermittent current arranged to magnetize the strip.

6. A number of electric measuring instruments, with current-actuated damping devices arranged adjacent to their movable parts, and a common source of current for all the damping devices.

7. In an electrical instrument, the combination of an oscillating or swinging shaft, a brake-piece for braking fractionally the movement of said shaft, a spring adjusted to normally hold the brake-piece out of contact with the shaft or parts connected thereto, and a coil inducing an alternating or intermitting magnetic field acting in opposition to the spring upon the brake-piece, as set forth.

In witness whereof I have hereunto set my hand this 16th day of July, 1897.

ELIHU THOMSON.

Witnesses:
JOHN W. GIBBONEY,
HENRY O. WESTENDARP.